United States Patent [19]

Gates

[11] Patent Number: 4,673,840

[45] Date of Patent: Jun. 16, 1987

[54] RUGGEDIZED MOUNT STRUCTURE FOR TUNGSTEN HALOGEN LAMP

[75] Inventor: Paul E. Gates, Danvers, Mass.

[73] Assignee: GTE Products Corporation, Danvers, Mass.

[21] Appl. No.: 623,522

[22] Filed: Jun. 20, 1984

Related U.S. Application Data

[63] Continuation of Ser. No. 369,714, Apr. 19, 1982, abandoned.

[51] Int. Cl.[4] ............................................. H01K 1/18
[52] U.S. Cl. ...................................... 313/25; 313/579; 313/244; 313/285; 313/315
[58] Field of Search .................... 313/579, 17, 25, 243, 313/244, 252, 256, 257, 258, 260, 267, 283, 284, 285, 315

[56] References Cited

U.S. PATENT DOCUMENTS

| | | | |
|---|---|---|---|
| 2,159,794 | 5/1939 | Hagen et al. | 176/38 |
| 3,243,634 | 3/1966 | Mosby | 313/285 |
| 3,723,790 | 3/1973 | Dumbaugh, Jr. et al. | 313/578 X |
| 4,074,167 | 2/1978 | Van Den Broek et al. | 313/579 |
| 4,139,794 | 2/1979 | Malm et al. | 313/579 |
| 4,338,540 | 7/1982 | Sovilla | 313/579 |
| 4,366,409 | 12/1982 | Nieda et al. | 313/252 X |
| 4,409,516 | 10/1983 | Thomas et al. | 313/579 |
| 4,441,051 | 4/1984 | Thomas | 313/315 X |

Primary Examiner—Palmer C. DeMeo
Assistant Examiner—K. Wieder
Attorney, Agent, or Firm—José W. Jimenez; William H. McNeill

[57] ABSTRACT

A tungsten-halogen lamp has a ruggedized mount structure employing tri-partite lead-in wires sealed in a soft glass stem and a hard glass capsule. Heavier intermediate sections provide support while the proximal and distal portions are different materials selected to form hermetic seals with the hard glass and soft glass.

6 Claims, 1 Drawing Figure

U.S. Patent    Jun. 16, 1987    4,673,840
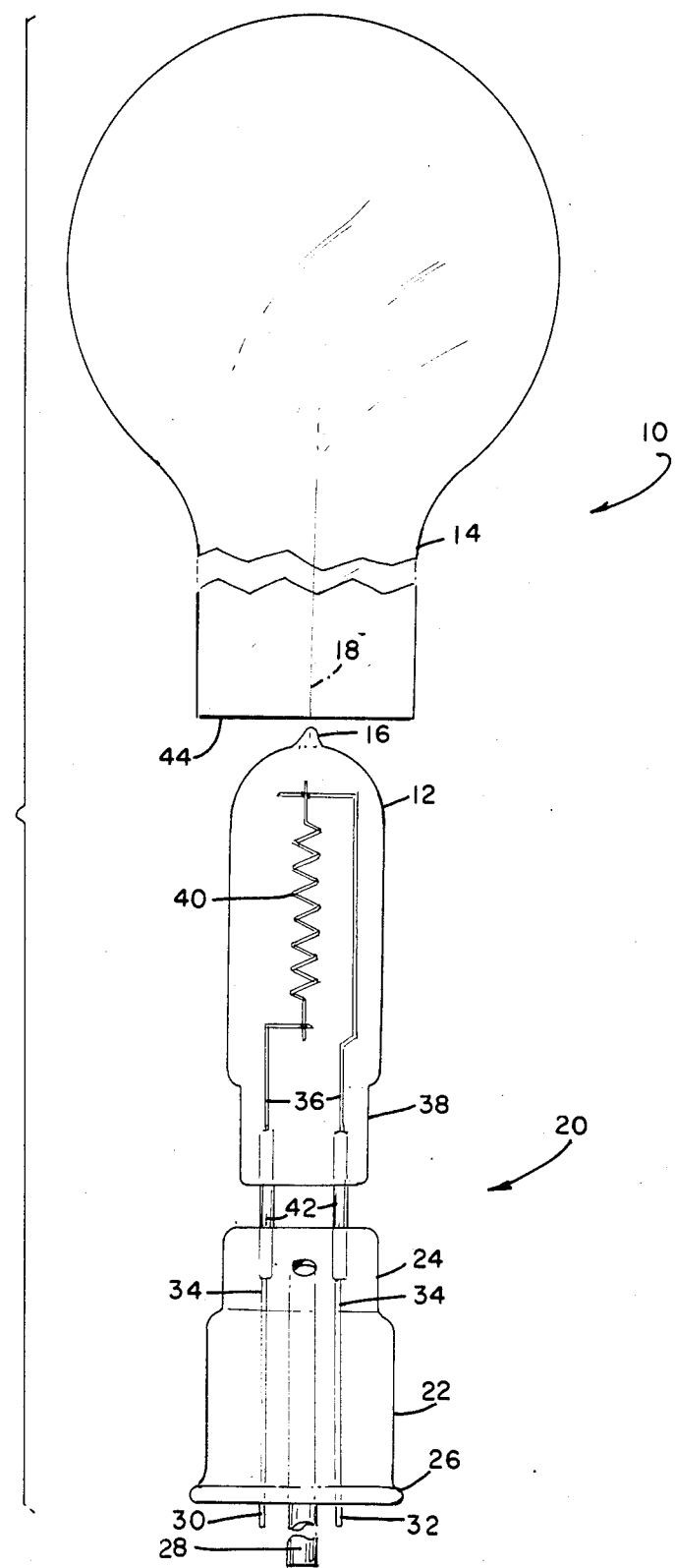

RUGGEDIZED MOUNT STRUCTURE FOR TUNGSTEN HALOGEN LAMP

This application is a continuation of application Ser. No. 369,714, filed Apr. 19, 1982 abandoned.

TECHNICAL FIELD

This invention relates to incandescent lamps and more particularly to tungsten-halogen incandescent lamps. Still more particularly, it relates to a rugged mount structure for supporting a hard glass light emitting capsule within a soft glass outer envelope.

BACKGROUND OF THE INVENTION

Tungsten-halogen lamps employing a halogen regenerative cycle are known. Such lamps operate with virtually 100% lumen maintenance over their service life because the halogen presence keeps evaporated tungsten from depositing on the bulb wall and blackening the same.

Originally, the light emitting capsules, which are quite small compared with a conventional incandescent envelope, were made from fused silica or quartz. Subsequent generations have employed various hard glasses, such as borosilicate and aluminosilicate. For the most part, tungsten-halogen lamps have been used in special purpose applications because of their relatively high cost. Generally, the lamp capsule exists, and is usable, by itself; occasionally, however, they have been contained in an outer envelope. Halogen headlamps for automobiles are an example of the latter.

When enclosed within an outer envelope, the light emitting capsule is generally mounted upon a stem or mounting structure, the latter structure being hermetically sealed to the outer envelope. This provides a relatively unstable and fragile construction because, during shipping, the heavy capsule would cause the lead-in wires to bend allowing the capsule to move over toward the bulb wall. Under certain conditions this could cause the outer envelope to break.

Furthermore, it generally is necessary to employ the same type of glass for the capsule, the stem and the outer envelope in order to match thermal expansion coefficients and sealing capabilities. This leads also to added expense since quartz or fused silica is much more costly than hard glass, and the latter is more expensive than soft glasses such as the common soda-lime glasses.

DISCLOSURE OF INVENTION

It is, therefore, an object of the invention to obviate the disadvantages of the prior art.

It is another object of the invention to enhance tungsten-halogen lamps.

It is another object of the invention to provide such a lamp with a rugged mount structure.

Yet another object of the invention is the provision of such a lamp utilizing a hard glass light emitting capsule mounted upon a soft glass stem which, in turn, is sealed to a soft glass outer envelope.

These objects are accomplished, in one aspect of the invention, by the provision of a tungsten-halogen incandescent lamp employing a hard glass light emitting capsule. The capsule is mounted upon a soft glass stem by means of a pair of lead-in wires. These wires comprise proximal portions which form a hermetic seal with stem distal portions which form a hermetic seal with capsule and extend internally thereof and mount a tungsten filament; and intermediate portions connecting the proximal and distal portions. The intermediate portions have ends engaged by the capsule and the stem; also, the intermediate portions have greater structural rigidity than the proximal and distal.

This construction provides a rigid mounting for the light emitting capsule allowing greater ease of shipment. Further, the use of the soft glass stem allows the use of a soft glass outer envelope, substantially reducing the cost, and, for the first time, making it practical to employ the very efficient halogen regenerative cycle in lamps designed for home use as a replacement for the standard incandescent lamp.

BRIEF DESCRIPTION OF THE DRAWING

The single FIGURE is an exploded view of an embodiment of the invention.

BEST MODE FOR CARRYING OUT THE INVENTION

For a better understanding of the present invention, together with other and further objects, advantages and capabilities thereof, reference is made to the following disclosure and appended claims taken in conjunction with the above-described drawing.

Referring now to the drawing with greater particularity, there is shown a tungsten-halogen incandescent lamp 10 having an inner, light transmitting, hermetically sealed, hard glass capsule 12. By hard glass is meant a material having a linear coefficient of thermal expansion of from about 58 to $32 \times 10^{-7}$ in/in/° C. Such glasses have softening temperature of from about 750° C. to about 950° C. and a strain point of about 515° C. Exemplary of such materials are the borosilicate and aluminosilicate glasses.

The capsule 12 is enclosed within a soft glass outer envelope 14. By soft glass is meant a material having a linear coefficient of thermal expansion of about $92 \times 10^{-7}$ in/in/° C. Such glasses have a softening temperature of about 695° C. and a strain point about 485° C. and are exemplified by the soda-lime glasses.

The capsule 12 and outer envelope 14 have longitudinal axes 16 and 18 respectively and, when assembled as a unit, these axes are aligned.

A mount structure 20 of soft glass, preferably the same material as envelope 14, comprises a re-entrant stem 22 having a first press 24 at one end thereof and a sealing area 26 at the opposite end thereof. An exhaust tubulation 28 can also be provided for evacuating and/or gas filling the outer envelope.

Two lead-in wires 30 and 32 are comprised of proximal portions 34 which are hermetically sealed in the first press 24. To form an hermetic seal it is necessary that the proximal portions 34 be selected from materials having a thermal expansion coefficient substantially matching that of the glass. In the case of soft glass, preferred materials are platinum and Dumet. The latter material comprises a nickel-iron core which is copper plated and can be borated to improve wetting action. It is a standard sealing component that has been used for many years.

The distal portions 36 are hermetically sealed in a second press 38 formed in capsule 12. The material for the distal portions 36 are selected from those materials which have substantially the same coefficient of expansion as the hard glass so that a stable, hermetic seal can be formed. Such materials include, for example, molybdenum and alloys thereof, such as molybdenum containing 3% tantalum.

The distal portions 36 extend internally of capsule 12 and mount a tungsten filament 40 (preferably in the form of a coiled coil) between the ends thereof.

Intermediate portions 42 connect the proximal and distal portions, as by being butt welded thereto. The intermediate portions 42 have ends which are engaged by the first press 24 and the second press 38, as by being sealed therein; however, it is not necessary that the latter seal be hermetic.

The intermediate portions 42 are formed to provide structural rigidity for the capsule-mount assembly. In the embodiment shown, the structural rigidity is supplied by forming intermediate portions 42 from material having a diameter that is from about 3 to about 5 times the diameter of the proximal and distal portions. In a preferred embodiment the proximal and distal portions can have a diameter of about between 0.0010 inches and 0.017 inches while the intermediate portions have a diameter of about 0.050 inches. A preferred material is nickel plated iron or No. 52 alloy, a material comprised of 50 wgt. % Fe and 50 wgt. % Ni.

To provide the rigidity function, the length of the intermediate portions should be as short as possible.

Upon assembly of the capsule-mount unit into outer envelope 14 the sealing area 26 of re-entrant stem 22 is sealed to the neck terminus 44 of outer envelope 14. Sealing can be conventional flame melting. The outer envelope 14 can then be evacuated and/or gas filled by means of exhaust tubulation 28. The tubulation is then tipped-off, or sealed, as is conventional.

Thus, there is provided a rugged support for a tungsten-halogen capsule which allows more expeditious shipping and handling thereof. Further, the employment of a soft glass stem and soft glass outer envelope provide significant cost reductions.

While there have been shown and described what are at present considered to be the preferred embodiments of the invention, it will be apparent to those skilled in the art that various changes and modifications can be made herein without departing from the scope of the invention as defined by the appended claims.

I claim:

1. A tungsten-halogen incandescent lamp comprising: an inner, light transmitting, hermetically sealed, hard glass capsule of relatively small volume and having a longitudinal axis; and an outer, light transmitting, hermetically sealed, soft glass envelope of relatively large volume and having a longitudinal axis; and a mount structure of soft glass, said mount structure comprising a re-entrant stem having a first press at one end thereof and a sealing are at the opposite end thereof; a pair of lead-in wires comprised of proximal portions a hermetic seal with said first press, distal portions forming a hermetic seal with a second press in said hard glass capsule and extending internally thereof and mounting a tungsten filament, and intermediate portions connecting said proximal and distal portions, said intermediate portions having greater structural rigidity than said proximal and distal portions, said intermediate portions having a diameter from about 3 to about 5 times the diameter of said proximal and distal portions.

2. The lamp of claim 1 wherein said proximal portions are selected from materials having substantially the same coefficient of thermal expansion as said soft glass.

3. The lamp of claim 2 wherein said distal portions are selected from materials having substantially the same coefficient of thermal expansion as said hard glass.

4. The lamp of claim 3 wherein said distal portions are selected from molybdenum and alloys thereof.

5. The lamp of claim 4 wherein said proximal portions comprise a nickel-iron core which is copper coated.

6. The lamp of claim 5 wherein said hard glass is selected from aluminosilicate and borosilicate glasses having thermal expansion coefficient of about 58 to $32 \times 10^{-7}$ in/in/° C. and said soft glass is selected from soda-lime glasses having thermal expansion coefficients of about $92 \times 10^{-7}$ in/in/° C.

* * * * *